United States Patent
Lebby et al.

[11] Patent Number: 6,080,690
[45] Date of Patent: *Jun. 27, 2000

[54] TEXTILE FABRIC WITH INTEGRATED SENSING DEVICE AND CLOTHING FABRICATED THEREOF

[75] Inventors: Michael S. Lebby, Apache Junction; Karen E. Jachimowicz, Laveen; Jamal Ramdani, Gilbert, all of Ariz.

[73] Assignee: Motorola, Inc., Schaumburg, Ill.

[ * ] Notice: This patent is subject to a terminal disclaimer.

[21] Appl. No.: 09/069,591

[22] Filed: Apr. 29, 1998

[51] Int. Cl.⁷ .................................................. D03D 15/00
[52] U.S. Cl. ....................... 442/209; 442/210; 442/212; 442/229; 139/420 R
[58] Field of Search ..................... 442/208, 209, 442/210, 212, 229; 139/420 R

[56] References Cited

U.S. PATENT DOCUMENTS

| | | |
|---|---|---|
| 3,288,175 | 11/1966 | Valco . |
| 3,507,321 | 4/1970 | Palma ......................................... 165/46 |
| 3,987,613 | 10/1976 | Woods et al. . |
| 4,196,355 | 4/1980 | Maine . |
| 4,590,623 | 5/1986 | Kitchman . |
| 5,103,504 | 4/1992 | Dordevic . |
| 5,906,004 | 5/1999 | Lebby et al. ..................................... 2/1 |
| 5,912,653 | 6/1999 | Fitch ........................................ 345/87 |

FOREIGN PATENT DOCUMENTS 0383059  12/1992  European Pat. Off. .

*Primary Examiner*—Christopher Raimund
*Attorney, Agent, or Firm*—Eugene A. Parsons; William E. Koch

[57] ABSTRACT

A textile fabric including a plurality of electrically conductive fibers and at least one electronic sensor or a plurality of sensing fibers. The textile fabric is intended for fabrication into a functional article of clothing or other item made of the woven textile fabric, so as to increase functionality of the article of clothing or item made thereof. The fabric is intended to assist a wearer in the monitoring of biomedical information and/or environmental conditions existent upon the wearer. The plurality of electrically conductive fibers and sensing devices are characterized as creating an interconnect to a portable electronic monitoring device, integrated components such as heating and cooling bands, electronics, or the like, or for serving as an antenna for signals received and transmitted between an integrated electronic component and a remote monitoring device.

20 Claims, 2 Drawing Sheets

TEXTILE FABRIC WITH INTEGRATED SENSING DEVICE AND CLOTHING FABRICATED THEREOF

FIELD OF THE INVENTION

This invention relates, in general, to textile fabric and, more particularly, to textile fabric that includes a means for sensing communicative information for increased functionality of clothing fabricated thereof.

BACKGROUND OF THE INVENTION

Clothes have always been to some extent a form of art and design, combining both color and functionality. Functionality of clothes is often limited to the design and the inclusion of various materials, and elements, such as pockets and loops, or the like. For the most part, today's clothing typically includes pockets, beltloops, buttons and buttonholes, snaps, etc., and other design elements that increase its functionality.

Generally speaking, the average person will wear a plurality of clothing articles on a daily basis. By utilizing the principles of functionality in the fabrication of textile fabrics, and more particularly clothing fabricated from these textile fabrics, increased potential can be found in everyday garments. More particularly, by integrating electronic components and functional fibers into textile fabrics, such as through the inclusion of metallic threads, holographic optical fibers, electronic sensors, sensing fibers, heating and cooling bands, or the like, clothes can be fabricated which are both user friendly in allowing the wearer to sense their environmental surroundings, sense and thus monitor biomedical data, and control their personal environment.

Current methods of monitoring and controlling environmental changes and biomedical information require dependency upon the attachment and connection of external devices. Typically, in monitoring biomedical information such as body temperature, blood glucose levels, body fluid levels, or the like, the individual from which this monitoring is sought, would need to be "hooked up" to an external device, or monitor. Under most circumstances this requires the external attachment of a monitoring device and thus the bulkiness and responsibility of carrying the device with the individual while the monitoring takes place.

In many instances, it would be beneficial to monitor and control the environment immediately surrounding an individual. Currently, such individual monitoring is not commonplace. By enabling an individual to monitor his immediate surrounding, adjustments can be made with regard to temperature of the surrounding air, and thus ultimately body temperature, through the heating or cooling of the person.

Thus, it would be highly desirable to provide for a textile fabric that when fabricated into a wearable article of clothing or other functional design, provides for increased functionality of the woven material and thus the clothing made thereof.

Accordingly, a textile fabric and article of clothing fabricated thereof, that integrates any combination of a plurality of electronic sensors or sensing fiber, a plurality of electrically conductive fibers, and a plurality of holographic optical fibers, would be highly desirable.

It is a purpose of the present invention to provide for a new and improved textile fabric, including any combination of a plurality of electronic sensors or sensing fibers, a plurality of electrically conductive fibers, a plurality of holographic optical fibers and at least one electronic component, that provides for increased functionality when fabricated into an article of clothing.

It is a further purpose of the present invention to provide for a textile fabric that allows for the fabrication of an article of clothing from the textile fabric in which the wearer is able to sense and monitor biomedical information, sense and control his personal environment or sense the environment immediately surrounding the wearer.

It is yet another purpose of the present invention to provide for a new and improved textile fabric and article of clothing including any combination of a plurality of electronic sensors or sensing fibers, a plurality of electrically conductive fibers, a plurality of holographic optical fibers and at least one electronic component, that provides for the monitor, control, receipt, transmission and ultimate display of informative information.

SUMMARY OF THE INVENTION

Briefly stated, provided is a textile fabric that includes at least one means for sensing communicative information such as any combination of a plurality of electronic sensors or sensing fiber, a plurality of electrically conductive fibers, a plurality of holographic optical fibers, or at least one electronic component and a plurality of additional textile fibers. The fabric is characterized as sensing and thus monitoring informative data. The textile fabric is intended for fabrication into a functional article of clothing or other item made of the woven textile fabric, so as to increase functionality of the article of clothing or item made thereof.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE DRAWINGS

The present invention discloses an inventive textile fabric with integrated electrically conductive fibers that is characterized as including a means for sensing communicative information in the form or either sensing fibers or electronic sensor components. Clothing fabricated from this inventive textile fabric would allow the wearer to achieve greater functionality from the clothing, such as allowing the user to sense his surrounding environment, monitor and control his own personal environment, and sense and monitor biomedical conditions. Optionally included in this type of textile fabric would be displays for the display of information sensed through the sensing fibers or electronic sensor(s). Dependent upon the layout of the electrically conductive fibers, and in addition to the sensing mechanisms, circuits, controllers, or other similar electronic components can be integrated or formed therein the textile fabric.

In one embodiment, the fabric would allow for the sensing and thus monitoring of biomedical information. The sensing of biomedical information would take place while the user was wearing an article of clothing fabricated from the inventive textile fabric. Subsequent to the sensing of biomedical information, the sensed information would be displayed on an integrated display and/or transmitted to an external monitor/controlling device for interpretation of the sensed biomedical information.

In an alternative embodiment, an inventive fabric including either electronic sensors or sensing fibers would generate information dependent upon the wearer of an article of clothing fabricated from the inventive fabric. Information such as body temperature and other environmental conditions existent upon the wearer would be sensed and thus controlled. In a further embodiment, incorporating the sensing and monitoring of environmental conditions as they play upon the wearer of the clothing fabricated from the inventive fabric, heating and cooling bands would be integrated into the fabric, and activated dependent upon information sensed by the electronic sensors or sensing fibers.

Figure 1:
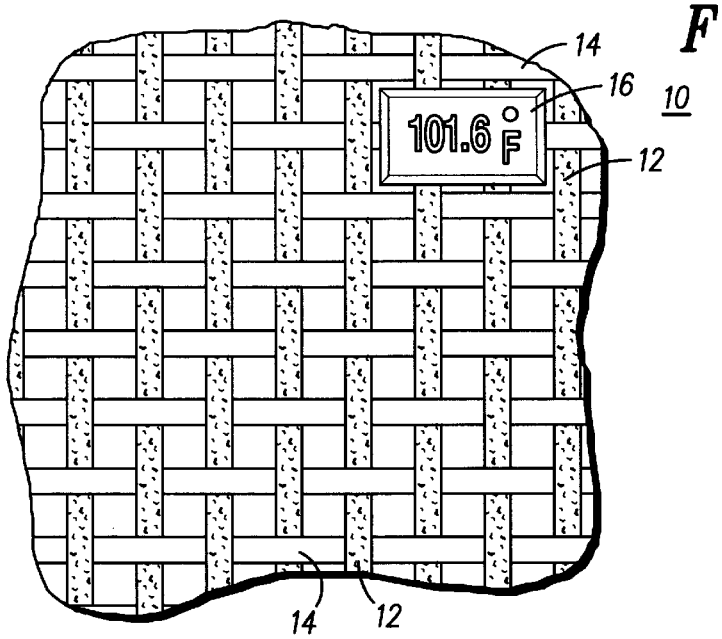
FIG. 1 is a plan view of a portion of a first embodiment of an inventive textile fabric illustrating a plurality of individual sensing fibers and a display according to the present invention.

Referring now to FIG. 1, illustrated in plan view is a portion of a first embodiment of an inventive textile fabric illustrating a plurality of individual sensing fibers and a display according to the present invention. Inventive textile fabric 10 is illustrated as including a plurality of sensing fibers 12 and a plurality of electrically conductive fibers 14. In addition, as illustrated inventive textile fabric 10 includes a display 16 for the display of information sensed by sensing fibers 12.

In this particular embodiment, sensing fibers 12 are characterized as sensing information generated by the wearer of an article of clothing fabricated from inventive textile fabric 10. More particularly, in this particular embodiment and as illustrated in FIG. 1, sensing fibers 12 sense the body temperature of the wearer of the article of clothing. In addition to sensing body temperature, inventive textile fabric 10 including sensing fibers 12 is characterized as sensing additional biomedical information with regard to the wearer of an article of clothing fabricated from textile fabric 10. Biomedical information such as that sensed by non-invasive procedures can be sensed through sensing fibers 12. Non-invasive procedures include biomedical information obtained through skin analysis, body moisture analysis, body temperature analysis, or the like.

Once information is sensed by sensing fibers 12, information is displayed in display 16. Display 16 in this particular embodiment is illustrated as an electronic component that is integrated into textile fabric 10 through electrically conductive fibers 14 which serve as interconnects. It should be understood that in the alternative, display 16 is integrated into textile fabric 10 being fabricated utilizing a plurality of holographic optical fibers (discussed presently) to form the display for communicative information.

Electrically conductive fibers 14, or metallic threads, are provided for the integration of display 16 and for the transmission of communicative information obtained from sensing fibers 12. For example, a wearer of an article of clothing fabricated from textile fabric 10 having biomedical information sensed by the clothing, would be able to have the sensed information transmitted to a remote monitoring device through electrically conductive fibers 14. In this instance, electrically conductive fibers 14 provide the interconnect with a wired or wireless interface to a remote monitoring device for the interpretation of the sensed information. Alternatively, textile fabric 10 would additionally serve as an antenna, or the like for the transmission of communicative signals. In the instance where inductive coupling is sought with a remote monitoring device, inventive fabric 10 would allow for the establishment of an electric charge or a magnetic field between the fabric and a portable electronic monitoring device based on the proximity of an electrified source, a magnet, or a magnetic field.

Generally speaking this type of textile fabric 10 would allow for the sensing of information as well as serving as an electrical interface, more specifically a wired or wireless interconnect, with a portable electronic monitoring device. In addition, electrically conductive fibers 14 would allow for the integration into textile fabric 10, additional electronic components, such as semiconductor chips, a power source, a controller for receiving sensed information, or other similar components typically found in a portable device that are individually addressable. This inclusion of electronic components or other similar components would allow for the reduction in size of a coupled electronic device. Further information regarding the integration of electrically conductive fibers into a textile fabric can be found in U.S. patent application Ser. 09/069,621 entitled "TEXTILE FABRIC WITH INTEGRATED ELECTRICALLY CONDUCTIVE FIBERS AND CLOTHING FABRICATED THEREOF", simultaneously filed herewith, bearing attorney docket number CR 98-041, assigned to the same assignee and incorporated herein by this reference now U.S. Pat. No. 5,906,004.

Figure 2:
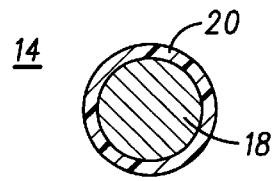
FIG. 2 is a simplified cross-sectional view of a single electrically conductive fiber according to the present invention.

Referring now to FIG. 2, illustrated in simplified cross-sectional view is a single electrically conductive fiber 14 according to the present invention. In this particular example, electrically conductive fiber 14 is composed of a central metallic core 18 and an insulative overcoating layer 20. Central metallic core 18 is described as composed of an electrically conductive material, which may include a metallic material, a semi-metallic material, a semi-insulative material, a semi-conductive material, a transparent conductive material and any other fiber material that provides sufficient current to induce wired or wireless coupling between textile fabric 10 and a portable electronic device for the interpreting of sensed information.

Figure 3:
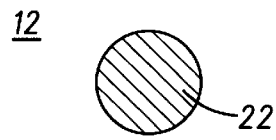
FIG. 3 is a simplified cross-sectional view of a single sensing fiber according to the present invention.

Referring now to FIG. 3, illustrated in simplified cross-sectional view is a single sensing fiber 12 according to the present invention. Sensing fiber 12 is generally composed of a conductive metal 22 that is capable of sensing temperature and moisture. Alternatively, or in addition to, sensing fiber includes a laser source, gratings and a sensing mechanism.

Sensing fiber 12, more particularly conductive metal 22, in a preferred embodiment includes a conductive material that is characterized as including sensing properties so as to be reactive to temperature and moisture fluctuations. Typically sensing fibers 12 will be based on sensing utilizing a fluorescent mechanism, a scattering mechanism, reflectance measurements, and/or spectroscopy. It is additionally disclosed, that measurements taken from the skin include information obtained through thermocouples and optical measurements.

Figure 4:
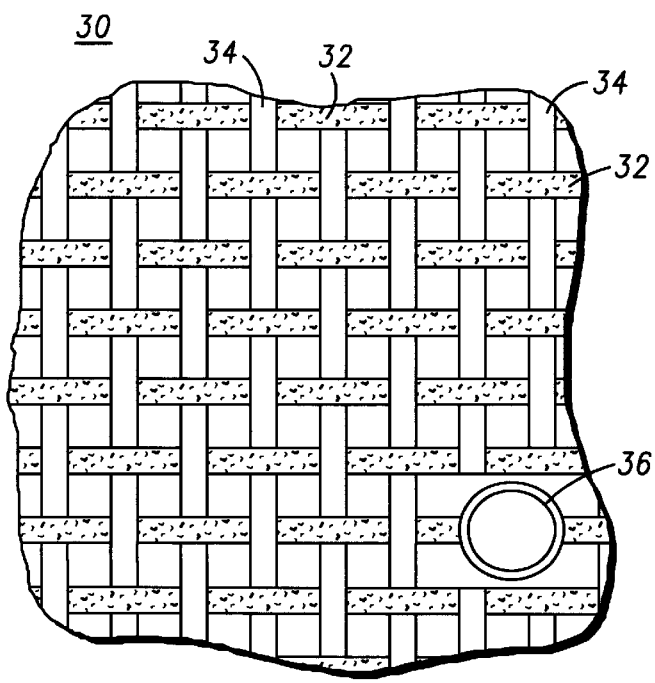
FIG. 4 is a plan view of a portion of a second embodiment of an inventive textile fabric according to the present invention illustrating a plurality of individual conductive fibers and an electronic sensing component.

Referring now to FIG. 4, illustrated in simplified plan view is a portion of a second embodiment of a textile fabric according to the present invention, referenced 30. Textile fabric 30 in this particular embodiment is composed of a plurality of electrically conductive fibers 32, a plurality of holographic optical fibers 34 and an electronic sensor 36. Similar to textile fabric 10 of FIG. 1, fibers 32 and fibers 34 are woven in orthogonal directions so as to define a simple grid system typically found in woven textile fabrics. Electrically conductive fibers 32 are disclosed as including a metallic material, a semi-metallic material, a semi-insulative material, a semi-conductive material, a transparent conductive material or any other fiber material that provides sufficient current to create an electromagnetic field. More particularly, metallic materials are disclosed as including steel, iron (Fe), nickel (Ni), cobalt (Co), copper (Cu), gold (Au), chromium (Cr), molybdenum (Mo), tungsten, tin, zinc, manganese, thallium, aluminum, magnesium, and the like and mixtures thereof. Semi-insulative materials include gallium nitride (GaN), aluminum nitride (AlN), and the like. Semi-metallic and semi-conductive materials include binary materials such as gallium arsenide (GaAs), aluminum phosphide (AlP), aluminum arsenide (AlAs), gallium phosphide (GaP), indium phosphide (InP), indium arsenide (InAs), gallium antimonide (GaSb), indium antimonide (InSb), zinc selenide (ZnSe), and the like. Ternary materials include gallium arsenide phosphide (GaAsP), aluminum gallium arsenide (AlGaAs), gallium indium antimonide (GaInSb), aluminum gallium phosphide (AlGaP), gallium indium arsenide (GaInAs), indium arsenide antimonide (InAsSb), and the like. Transparent conductive materials include transparent metals such as indium oxide (InO), tin oxide (SnO), indium-tin-oxide (ITO), or the like.

Holographic optical fibers 34 are disclosed as textile fibers that selectively absorb or reflect different wavelengths of light using layers of transparent optical media with differing indices of refraction. When these layers of differing indices of refraction are positioned correctly with respect to incident light, colors, patterns and images are formed by the resulting interference patterns. The multi-layer interference coatings are designed to selectively reflect a particular band of wavelengths, while transmitting others. When utilizing a plurality of these holographic optical fibers to form a portion of textile fabric 30, the resulting interference patterns of the plurality of holographic optical fibers 34 form varying colors, patterns, and images, and thus can be utilized to form displays in textile fabric 30, more particularly in clothing fabricated from textile fabric 30, thus eliminating the need for a display on an associated portable electronic device or a display component, such as display 16 of FIG. 1, integrated into fabric 30.

In addition, as illustrated in FIG. 3, textile fabric 30 includes an electronic sensor device 36. Electronic sensor 36 is interfaced with the plurality of electrically conductive fibers 32 which serve as an interconnect with a controller (not shown). In this particular embodiment, electronic sensor 36 is disclosed as an electrochemical sensor that is in direct contact with the skin. It is further disclosed that anticipated by this disclosure are organic based sensors, such as polyphenilacetylene based sensors, or those including organic or inorganic materials, such as silver oxide ($AgO_2$), zinc oxide ($ZnO_2$) or the like. Gas sensors such as those capable of measuring carbon monoxide (CO) or carbon dioxide ($Co_2$) sensors can additionally be integrated into the clothing. In this particular embodiment electronic sensor 36 is characterized as sensing biomedical information and/or environmental information dependent upon design. More particularly, electronic sensor 36 is characterized as sensing non-invasive biomedical information such as that previously disclosed with regard to FIG. 1 and in addition, invasive biomedical information, such as that obtained through blood, and or other bodily components that require invasive procedures. In this particular instance, electronic sensor 36 would be interfaced with an intravenous catheter, or the like. Similar to FIG. 1, once sensed information is obtained, it would be "gathered" by an integrated controller device (discussed presently) and submitted to a remote monitoring device. Typically, sensed information is transmitted to a remote monitoring device through electrically conductive fibers 14. In this instance, electrically conductive fibers 14 additionally provide the interconnect with a wired or wireless interface to a remote monitoring device (not shown).

Figure 5:
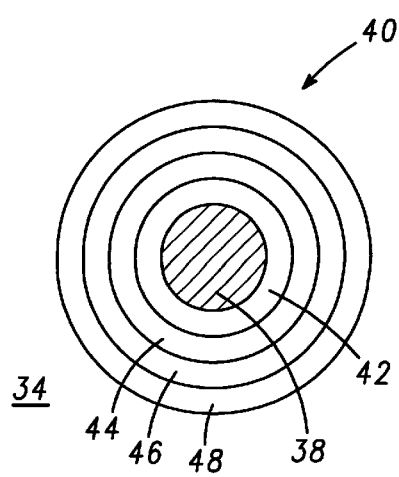
FIG. 5 is a simplified cross-sectional view of a single holographic optical fiber according to the present invention.

Referring now to FIG. 5, illustrated in further detail is holographic optical fiber 34 according to the present invention. In this particular embodiment, holographic optical fiber 34 is described as a passive holographic optical fiber. As illustrated, fiber 34 includes a light absorbing central core 38, surrounding by a plurality of layers of optical media material having varying indices of refraction, designated multi-layer overcoating 40. More particularly, fiber 34 includes light absorbing central core 38, such as a black thread, and a first layer of optical media 42 having an index of refraction of $n_1$, a second layer of optical media 44 having an index of refraction of $n_2$, a third layer of optical media 46 having an index of refraction of $n_1$ and a fourth layer of optical media 48 having an index of refraction of $n_2$. In general, when light absorbing central core 38 is composed of a black thread, the black thread consists of a plurality of threads, twisted so as to form a single thread. In keeping with this theory of a twisted black core thread, layers 42, 44, 46 and 48 can also be formed so as to twist around light absorbing central core 38, generally forming a single twisted textile fiber. It should be understood that central core 38 in an alternate embodiment includes either a light reflecting material or a light transmitting material. In this particular embodiment, a white light, including red, green and blue wavelength light, is incident on fiber 34. As illustrated, due to the varying indices of refraction of layers 42, 44, 46, and 48 a portion of the incident light will be transmitted through layers 42, 44, 46 and 48 and will be ultimately absorbed by absorbing core 38 and a portion of the light will be reflected by the multi-layer stack of optical media 40 on fiber 34. This reflection of a specific wavelength of light will be seen as giving color to fiber 34. This fiber is described as being passive, in that there is no change in the index of refraction of the layers 42, 44, 46, and 48 thus fiber 34 always reflects the same wavelength of light and is thus always seen as one particular color. It should be understood that there can be greater or fewer layers than those shown in the preferred embodiment, more indices of refraction and differences in thicknesses depending on the particular wavelength of light to be reflected. In addition, an active fiber can be fabricated through the addition of a conductive layer that provides for an external voltage to be applied to a specific multi-layer overcoating. An example of a material which would change its index of refraction under the influence of a voltage is a liquid crystal material. Thus under the influence of a voltage, the index of refraction of at least one of the optical layers would be changed, thus changing the reflecting properties of fiber 34. This integration of holographic optical fibers 34 in textile fabric 30 allows for the display of sensed information in a portion of textile fabric 30 where the holographic optical fibers 34 are located. Additional information on holographic optical fibers can be found in U.S. patent application Ser. No. 09/069,590 entitled "HOLOGRAPHIC OPTICAL FIBER", filed simultaneous herewith, bearing attorney docket number CR 98-044, assigned to the assignee and incorporated herein by this reference now pending.

Figure 6:
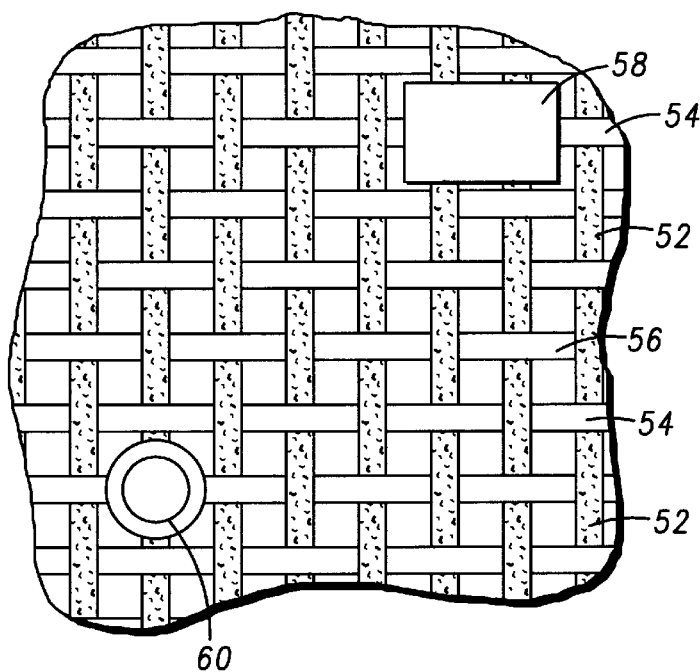
FIG. 6 is a plan view of a portion of a third embodiment of an inventive textile fabric according to the present invention illustrating a plurality of individual heating and cooling bands, a controller, a plurality of electrically conductive interconnect fibers, and an electronic sensor component according to the present invention.

Referring now to FIG. 6, illustrated in simplified plan view is a portion of a third embodiment of the textile fabric according to the present invention, generally referenced as 50. Textile fabric 50 in this particular embodiment is composed of a plurality of electrically conductive fibers 52, a plurality of cooling bands 54, a plurality of heating bands 56, a controller component 58 and an electronic sensor 60. Fibers 52, 54, and 56 are woven orthogonal to each other so as to create a grid system composed of electrically conductive fibers 52 and heating and cooling bands, or fibers, 54 and 56. As previously disclosed, electrically conductive fibers 52 include at least one of a metallic material, a semi-metallic material, a semi-insulative material, a semi-conductive material, a transparent conductive material or any other fiber material that provides sufficient current to permit electrically conductive fibers 52 to serve as interconnects.

In this particular embodiment, electronic sensor 60 operates to sense the environmental conditions surrounding a wearer of an article of clothing fabricated from textile fabric 50. In addition, electronic sensor 60 senses the body temperature of the wearer of the article of clothing. Environmental conditions being sensed include temperature, humidity, and the like. In response to the sensed information, controller 58 interprets the sensed information and controls the operation of heating and cooling bands 54 and 56. The power required to activate heating and cooling bands 54 and 56 is supplied by an integrated battery power source (not shown) or from solar cells with storage capacitors (not shown) also integrated into the clothing. Electronic sensor 60, controller 58 and heating and cooling bands 54 and 56 are interfaced using conductive fibers 52. It should be understood, that an embodiment in which electronic sensor 60 is replaced with sensing fibers as disclosed in FIG. 1 is anticipated by this disclosure. In addition, fabric in which either heating bands or cooling bands are integrated to the exclusion of the other is anticipated by this disclosure.

Figure 7:
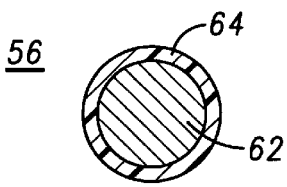
FIG. 7 is a simplified cross-sectional view of a single heating band, or heating fiber, according to the present invention.

Referring now to FIG. 7, illustrated in simplified cross-sectional view is a single heating band 56, or heating fiber, according to the present invention. In this particular embodiment, heating band 56 is generally composed of a conductive metal material 62. Conductive metal material 62 is disclosed as any metal material which creates sufficient resistance to generate heat, such as platinum (Pt), tungsten (W), or the like. This generated heat is dissipated through a protective overcoating material 64, such as a fabric material, a plastic material, or the like. This dissipation of heat in response to sensed environmental conditions, allows for greater comfort to be achieved by the wearer of an article of clothing fabricated from inventive textile fabric 50.

Figure 8:
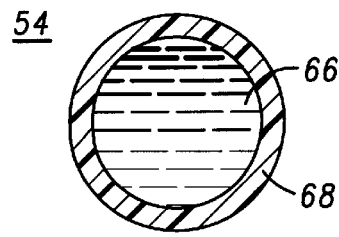
FIG. 8 is a simplified cross-sectional view of a single cooling band, or cooling fiber, according to the present invention.

Referring now to FIG. 8, illustrated in simplified cross-sectional view is a single cooling band 54, or cooling fiber, according to the present invention. In this particular embodiment, cooling band 54 is generally composed of a outer tubing-like material 68, such as a thin plastic material, a fabric material, or similar type material capable of enclosing therein a material 66, such as water, bismuth telluride ($Bi_2Te_3$) or other thermoelectric material that will produce a cooling effect upon the wearer. In this particular embodiment material 66 is disclosed as any fluid, or alternatively, semi-fluid or solid material which creates a cooling effect upon the wearer of an article of clothing fabricated from the inventive textile fabric 50 in response to sensed information. This dissipation of a cooling effect in response to sensed environmental conditions, allows for greater comfort to be achieved by the wearer of an article of clothing fabricated from inventive textile fabric 50. As previously stated, it should be understood that while fabric 50 is described as including both cooling bands 54 and heating bands 56, an embodiment in which either heating bands or cooling bands, to the exclusion of the other type, is anticipated by this disclosure.

Figure 9:
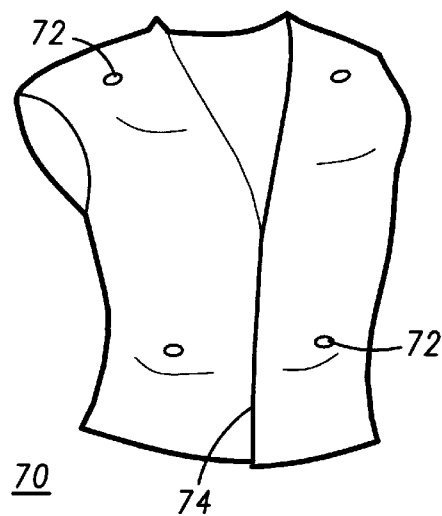
FIG. 9 is a simplified front view of an article of clothing fabricated from the inventive textile fabric of the present invention.

Referring now to FIG. 9, illustrated in simplified front view is an article of clothing 70 fabricated from the inventive textile fabric of the present invention. In this particular embodiment, clothing 70 includes portions of fabric generally similar to textile fabric 10 of FIG. 1 and fabric 50 of FIG. 6. As illustrated, clothing 70 is designed in the style of an undergarment or T-shirt and is intended to be worn by one seeking to monitor biomedical information as well as control environmental conditions. As illustrated, clothing 70 includes a front closure 72 to aid the wearer in proper placement of clothing 70, more particularly in the placement of any included electronic sensors 72, catheters, medical devices, or the like. It should be understood that in this particular embodiment, clothing 70, more particularly sensors 72, rests adjacent the wearer's skin when positioned properly.

Clothing 70 includes within the fabric, a plurality of electrically conductive fibers (not shown), generally similar to electrically conductive fibers 12 of FIG. 1. Electrically conductive fibers 12 facilitate the transmission of sensed information from electronic sensors 72 to a remote monitoring device (not shown) for interpretation of sensed information. Portable electronic monitoring device is disclosed as being in electrical communication with the plurality of electrically conductive fibers through at least one of a wired or wireless interface, such as through a plug-in type connector or through a wireless connection, such as inductive coupling. Furthermore, it should be understood the integration of additional electronic components are intended by this disclosure and would lead to increased functionality of clothing 70. In addition, clothing 70 can include antenna capabilities as previously discussed with regard to FIG. 1, to further improve the receipt and transmission of communicative signals with the remote monitoring device. It should be understood that while described is an article of clothing in the style of an undergarment or T-shirt, this is only intended to be representative of any number of styles of clothing that can be fabricated from the inventive textile fabric of the present invention.

Thus, described is a textile fabric including a plurality of electrically conductive textile fibers, and at least one electronic sensor or a plurality of sensing fibers, that dependent upon specific fabrication can be fabricated into an article of clothing thus providing for the sensing and thus monitoring of biomedical information and/or environmental conditions. The textile fabric and clothing fabricated thereof as described is intended for use by a consumer seeking to monitor biomedical factors having sensed information transmitted to a remote monitoring device for interpretation and/or the controlling of personal environmental conditions through heating and/or cooling bands integrated into the clothing.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A textile fabric fabricated into a functional article of clothing and including at least one means for sensing communicative information and a plurality of electrically conductive fibers, the at least one means for sensing communicative information and the plurality of electrically conductive fibers woven orthogonal to each other to create a textile fabric composed of the at least one means for sensing communicative information and the plurality of electrically conductive fibers interwoven into a grid system, in combination the at least one means for sensing communicative information and the plurality of electrically conductive fibers characterized as sensing communicative information and providing an interconnect for the transmission of sensed communicative information.

2. A textile fabric according to claim 1 wherein the sensing of communicative information includes the sensing of at least one of a range of biomedical information generated by the wearer of the article of clothing or a range of environmental conditions existent about the wearer of the article of clothing.

3. A textile fabric according to claim 2 wherein the range of biomedical information includes information obtained by monitoring the heart, monitoring the blood, and monitoring bodily fluids.

4. A textile fabric according to claim 2 further including at least one electronic sensor integrated into the textile fabric.

5. A textile fabric according to claim 2 wherein the at least one means for sensing communicative information includes a plurality of sensing fibers integrated into the textile fabric.

6. A textile fabric according to claim 2 wherein the textile fabric further includes a plurality of heating and cooling fibers.

7. A textile fabric according to claim 6 wherein the plurality of heating and cooling fibers are activated by a controller device in response to sensed environmental conditions of a wearer of the clothing.

8. A textile fabric fabricated into a functional article of clothing comprising:
 a plurality of electrically conductive fibers characterized as providing an interconnect for the transmission of sensed communicative information;
 a plurality of additional fibers, the plurality of electrically conductive fibers and the plurality of additional fibers woven orthogonal to each other to create a textile fabric composed of the plurality of electrically conductive fibers and the plurality of additional fibers interwoven into a grid system, the plurality of additional fibers characterized as sensing communicative information; and
 a display interfaced with the plurality of electrically conductive fibers and the plurality of additional fibers.

9. A textile fabric according to claim 8 further including an electronic sensor interfaced with the plurality of electrically conductive fibers.

10. A textile fabric according to claim 8 wherein the plurality of additional fibers includes a plurality of sensing fibers interfaced with the plurality of electrically conductive fibers.

11. A textile fabric according to claim 8 wherein the display includes an electronic display component interfaced with the plurality of electrically conductive fibers and characterized as generating a display of sensed communicative information.

12. A textile fabric according to claim 8 wherein the plurality of additional fibers includes a plurality of holographic optical fibers interfaced with the plurality of electrically conductive fibers and characterized as generating a display of sensed communicative information.

13. A textile fabric according to claim 8 wherein the plurality of additional fibers includes one of a plurality of heating fibers or a plurality of cooling fibers.

14. A textile fabric according to claim 8 wherein the plurality of additional fibers are characterized as sensing biomedical information regarding the wearer of the functional article of clothing.

15. A textile fabric according to claim 8 wherein the plurality of additional fibers are characterized as sensing environmental conditions existent upon a wearer of the functional article of clothing.

16. A textile fabric fabricated into a functional article of clothing comprising:
 at least one sensing device for sensing communicative information;
 a plurality of electrically conductive fibers, in combination with the at least one sensing device, characterized as sensing communicative information and providing an interconnect for the transmission of sensed communicative information; and
 at least one of a plurality of heating or a plurality of cooling fibers interfaced with the plurality of electrically conductive fibers, the plurality of electrically conductive fibers and the at least one of a plurality of heating or a plurality of cooling fibers woven orthogonal to each other to create a textile fabric composed of the plurality of electrically conductive fibers and the at least one of a plurality of heating or a plurality of cooling fibers into a grid system.

17. A textile fabric according to claim 16 wherein the at least one sensing device includes an electronic sensor interfaced with the plurality of electrically conductive fibers.

18. A textile fabric according to claim 16 wherein the at least one sensing device includes a plurality of sensing fibers interfaced with the plurality of electrically conductive fibers.

19. A textile fabric according to claim 16 wherein the textile fabric further includes a plurality of holographic optical fibers interfaced with the plurality of electrically conductive fibers and characterized as generating a display of sensed information.

20. A textile fabric according to claim 16 wherein the at least one sensing device for sensing communicative information is characterized as sensing at least one of biomedical information regarding the wearer of the functional article of clothing or environmental conditions existent upon a wearer of the functional article of clothing.

* * * * *